(12) United States Patent
Kim

(10) Patent No.: US 9,909,714 B2
(45) Date of Patent: Mar. 6, 2018

(54) LUBRICATOR

(71) Applicant: HANIL LUBTEC CO., LTD., Ansan-si, Gyeonggi-do (KR)

(72) Inventor: Yona Kim, Seoul (KR)

(73) Assignee: HANIL LUBTEC CO., LTD., Ansan-si, Gyeonggi-Do (KR)

( * ) Notice: Subject to any disclaimer, the term of this patent is extended or adjusted under 35 U.S.C. 154(b) by 214 days.

(21) Appl. No.: 14/888,408

(22) PCT Filed: May 21, 2014

(86) PCT No.: PCT/KR2014/004531
§ 371 (c)(1),
(2) Date: Oct. 30, 2015

(87) PCT Pub. No.: WO2014/189280
PCT Pub. Date: Nov. 27, 2014

(65) Prior Publication Data
US 2016/0084435 A1    Mar. 24, 2016

(30) Foreign Application Priority Data

May 21, 2013 (KR) .......................... 10-2013-0057037

(51) Int. Cl.
*F16N 13/06* (2006.01)
*F16N 25/02* (2006.01)
(Continued)

(52) U.S. Cl.
CPC .............. *F16N 13/06* (2013.01); *F16N 7/36* (2013.01); *F16N 13/16* (2013.01); *F16N 13/22* (2013.01);
(Continued)

(58) Field of Classification Search
CPC .......... F16N 13/06; F16N 13/16; F16N 13/22; F16N 7/36; F16N 25/02
See application file for complete search history.

(56) References Cited

U.S. PATENT DOCUMENTS 3,317,002 A * 5/1967 McKenzie .............. F16N 13/06
137/565.34
5,285,871 A * 2/1994 Sievenpiper ............ F16N 11/10
184/29
(Continued)

FOREIGN PATENT DOCUMENTS

JP    06-137489 A    5/1994
JP    2004-511741 A    4/2004
(Continued)

OTHER PUBLICATIONS

Search Report for International Application No. PCT/KR2014/004531.

*Primary Examiner* — Michael A Riegelman
(74) *Attorney, Agent, or Firm* — LRK Patent Law Firm

(57) ABSTRACT

A lubricator includes a pump body configured to include a cylinder, an inlet passage, a first outlet passage and a second outlet passage, a piston configured to include an inlet port, a circumferential groove and an inner passage, and inserted into the cylinder, first to fourth check valves provided on the inlet side of the inlet passage, the outlet sides of the first and second outlet passages and the inner passage of the piston, a lubricant containing unit connected to the first check valve, and a piston driving unit configured to reciprocate the piston.

10 Claims, 20 Drawing Sheets

(51) Int. Cl.
*F16N 7/36* (2006.01)
*F16N 13/16* (2006.01)
*F16N 13/22* (2006.01)

(52) U.S. Cl.
CPC ........ *F16N 25/02* (2013.01); *F16N 2013/063* (2013.01)

(56) References Cited

U.S. PATENT DOCUMENTS

| | | | | |
|---:|---|---|---|---|
| 5,497,852 | A * | 3/1996 | Little | F16N 25/02 |
| | | | | 184/29 |
| 6,286,627 | B1 * | 9/2001 | Grach | E21B 17/006 |
| | | | | 184/6 |
| 9,671,065 | B2 * | 6/2017 | Conley | F16N 29/00 |
| 2007/0187181 | A1 * | 8/2007 | Brendel | F16N 13/06 |
| | | | | 184/6.14 |
| 2010/0219020 | A1 * | 9/2010 | Knox | B65G 45/02 |
| | | | | 184/7.4 |
| 2013/0034458 | A1 * | 2/2013 | Ozeki | F04B 23/025 |
| | | | | 417/498 |

FOREIGN PATENT DOCUMENTS

| | | |
|---|---|---|
| JP | 2010-106868 A | 5/2010 |
| KR | 10-0637395 B1 | 10/2006 |

* cited by examiner

FIG. 9
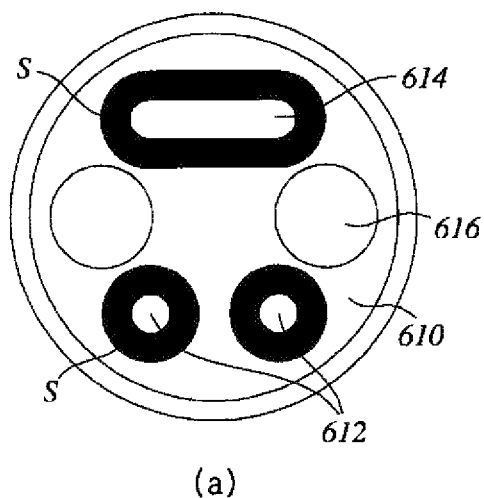
(a)
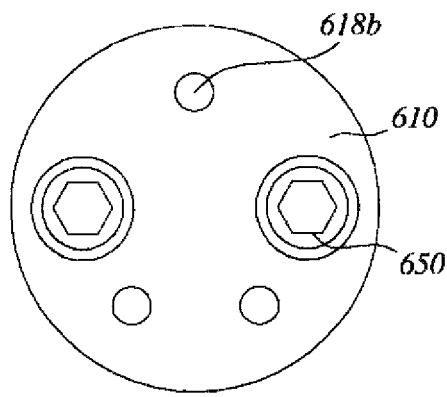
(b)

FIG. 15
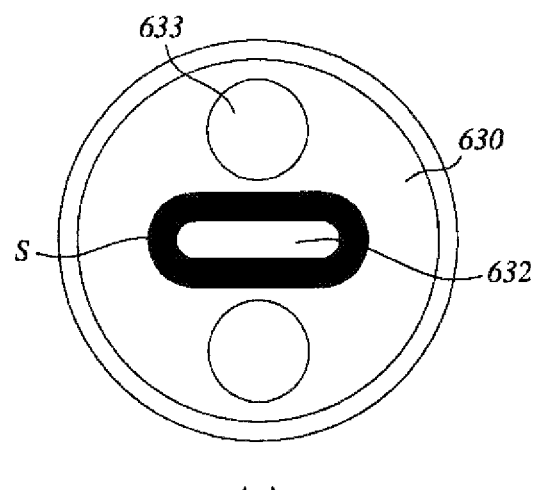
(a)
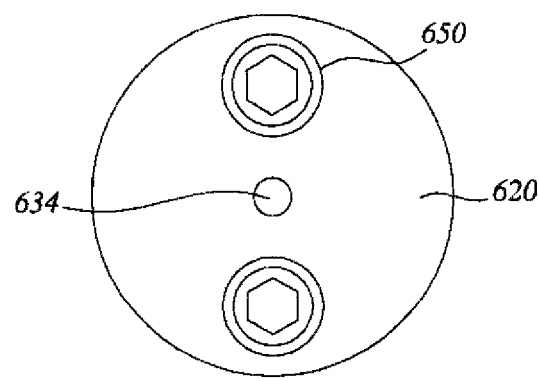
(b)

LUBRICATOR

TECHNICAL FIELD

The present invention generally relates to a lubricator that includes one pump and two outlets and can efficiently supply lubricant to two lubrication target points without a distributing device.

BACKGROUND ART

In general, lubrication pumps are used to supply lubricant, such as grease or oil, to lubrication target points in a variety of rotating machines, such as electric motors, pumps, and blowers. In this case, the lubrication target points chiefly refer to bearings that are used for the purpose of supporting the rotating shafts of rotating machines.

FIG. 1 is a view showing an application of a conventional lubrication pump. A conventional typical lubrication pump is a small pump, which has a single outlet. Accordingly, the lubrication pump itself can supply lubricant to a single lubrication target point.

However, a typical rotating machine, such as a motor M shown in FIG. 1, has two lubrication target points because both ends of a rotating shaft A are supported by respective bearings B. Accordingly, in the case of the conventional art, two lubrication pumps are generally applied to the single rotating machine M, as shown in FIG. 1. In other words, the conventional art has problems including inefficiency and higher cost because two lubrication pumps are required to lubricate a rotating machine.

In another conventional art that uses a lubrication pump and also a special valve, such as a distributing valve, can make lubricant discharged from one single outlet of the lubrication pump be separately discharged to two outlets through the distributing valve. However, since the distribution valve is added to the single pump, this technology also has problems in that installation is complicated and costs are increased.

In still another conventional art, a passage can be divided into two passages by applying a member, called a tee, to a single outlet of a lubrication pump. However, this application has a problem in that different amounts of lubricant are apt to be supplied to two lubrication points though they require the same amount of lubricant because the resistances of line produced in the respective passages cannot be kept the same.

DISCLOSURE

Technical Problem

The present invention is intended to overcome the above-described problems of the conventional arts, and an object of the present invention is to provide a lubricator that includes two outlets and thus can independently supply lubricant to two lubrication target points.

Another object of the present invention is to provide a lubricator which can combine the two outlets and thus can discharge lubricant selectively through only one of the two outlets when required.

Technical Solution

In order to accomplish the above-described objects of the present invention, there is provided a lubricator, including; a pump body configured to include a cylinder configured such that one end thereof is closed and the other end thereof is open; an inlet passage formed on one end side of the cylinder perpendicularly to the cylinder, and formed to communicate with the cylinder, a first outlet passage disposed opposite the inlet passage, and formed to communicate with the cylinder; and a second outlet passage spaced apart from locations, at which the inlet passage and the first outlet passage are formed, by predetermined distances in a direction of the other end of the cylinder, and formed to communicate with the cylinder; a piston configured to include an inlet port formed at one end thereof, a circumferential groove spaced apart from the inlet port by a predetermined distance in a direction of the other end thereof and an inner passage configured to connect the inlet port and the circumferential groove, and configured to be inserted into the cylinder; first to fourth check valves provided on the inlet side of the inlet passage, the outlet sides of the first and second outlet passages, and the inner passage of the piston, respectively; a lubricant containing unit configured to contain lubricant, and connected to the first check valve; and a piston driving unit configured to drive the piston so that the inlet port of the piston reciprocates between the one end of the cylinder and a location between the first and second outlet passages.

In the lubricator according to the present invention, the first check valve includes an inlet through which the lubricant enters, and is fitted into a first seating recess formed in the pump body to communicate with the inlet passage. Furthermore, the second and third check valves include first and second outlets, respectively, through which the lubricant is discharged, and are fitted into second and third seating recesses, respectively, formed in the pump body to communicate with the first and second outlet passages.

In this case, each of the first to fourth check valves preferably includes a valve structure that includes a ball and a compression spring so that a corresponding one of the inlet, the first outlet passage, the second outlet passage and the inlet port is selectively opened and closed.

Furthermore, each of the piston and the first to third check valves is preferably provided with a seal formed on an outer circumference thereof.

Furthermore, in the lubricator according to the present invention, the lubricant containing unit is preferably a cartridge fully filled with the lubricant, and is preferably replaceable with a fully filled cartridge when the lubricant is exhausted.

In this case, the lubricant containing unit includes a neck, connected to the first check valve, in the center portion of the bottom surface thereof; and the lubricant containing unit further includes: a cartridge configured to have the shape of a bellows that is vertically pressed; a support plate configured to support the bottom surface of the cartridge; a pressing plate disposed on the top surface of the cartridge; a spring configured to push down the pressing plate; and a cover configured to cover the cartridge, the support plate, the pressing plate and the spring so that the spring is in the state of being pressed.

Furthermore, in the lubricator according to the present invention, the piston driving unit may include a motor configured to provide rotating speed, a reduction gear train configured to reduce the rotating speed of the motor, a crank eccentrically connected to an end gear of the reduction gear train, and a pin configured to connect the crank and the other end of the piston; and the piston driving unit may have a structure that converts the rotational movement of the motor into the linear reciprocal movement of the piston.

Alternatively, the piston driving unit may be a linear motion device including a pneumatic actuator, a hydraulic actuator, a linear motor, or a manual device.

Furthermore, in the lubricator according to the present invention, a first branch passage is provided such that one end thereof is branched off from an inner passage of the second check valve, and a second branch passage is provided such that one end thereof is branched off from an inner passage of the third check valve; the other ends of the first branch passage and the second branch passage extend to a cross-porting device body positioned on one side of the pump body, and thus a pair of outlets is formed on one side of the cross-porting device body; a pair of right circular recesses each configured to cover a corresponding one of the first and second outlets of the cross-porting device body and an oblong circular recess configured to cover both the first and second outlets of the cross-porting device body are formed in one surface of a converter plate so that the pair of right circular recesses and the oblong circular recess are selectively disposed on the first and second outlets of the cross-porting device body; and the converter plate is fastened to one surface of the cross-porting device body by bolts so that the pair of right circular recesses or the oblong circular recess is disposed on the first and second outlets of the cross-porting device body, and thus lubricant is discharged separately through the first and second outlets or through one of the first and second outlets in a cross-porting manner.

Alternatively, a first branch passage may be provided such that one end thereof is branched off from an inner passage of the second check valve, and a second branch passage may be provided such that one end thereof is branched off from an inner passage of the third check valve; the other end of the first branch passage and the other end of the second branch passage may extend to a cross-porting device body positioned on one side of the pump body, and thus a pair of outlets is formed on one side of the cross-porting device body; a pair of right circular recesses each configured to cover a corresponding one of the first and second outlets of the cross-porting device body may be formed in one surface of a first converter plate, and an oblong circular recess configured to cover both the first and second outlets of the cross-porting device body may be formed in one surface of a second converter plate; and the first and second converter plates may be stacked on each other and fastened to one surface of the cross-porting device body by bolts so that the pair of right circular recesses of the first converter plate or the oblong circular recess of the second converter plate is disposed on the first and second outlets of the cross-porting device body, and thus lubricant is discharged separately through the first and second outlets or through one of the first and second outlets in a cross-porting manner.

Furthermore, a seal is preferably formed on the inner circumference of each of the pair of right circular recesses and the oblong circular recess.

Furthermore, the converter plate is provided with marks configured to indicate separate discharging and cross-porting.

Advantageous Effects

As described above, the lubricator according to a preferred embodiment of the present invention has a structure that can discharge lubricant separately through two outlets. Accordingly, the lubricator according to the embodiment has the advantage of significantly reducing lubrication costs compared to the technology using two conventional lubrication pumps each having a single outlet.

Meanwhile, in another conventional technology, a valve device, such as a distribution valve, is used such that lubricant discharged from a pump is branched off from one passage to two passages. In contrast, in the lubricator of the present invention, lubricant discharged from two outlets is discharged through separate passages. Accordingly, the lubricator of the present invention has a structure in which there is no interference attributable to the difference in flow rate or pressure between the separate two passages. That is, the lubricator according to the present invention can independently lubricate two lubrication target points regardless of the diameters or lengths of pipes extending from the respective outlets to the two lubrication target points. Therefore, constant amounts of lubricant can be supplied to the two lubrication target points.

Furthermore, the lubricator according to the present invention includes the cross-porting device, and thus the lubricator can discharge lubricant separately through the two outlets and can discharge lubricant selectively through one of the two outlets by combining the two outlet passages. That is, the present invention has an advantage in that it can easily deal with a case where only a single lubrication target point requires lubrication depending on the situation.

Furthermore, the cross-porting device provides high visibility that enables a user to easily recognize whether lubricant is discharged separately or in cross-porting manner, thereby achieving the advantage of providing convenience to the user.

Other objects, advantages and novel features of the present invention will be more apparent from the accompanying drawings, the following detailed description, and the preferred embodiments.

DESCRIPTION OF DRAWINGS

FIG. 9 shows diagrams viewed from directions A-A and B-B of FIG. 8;

FIG. 15 shows diagrams viewed from directions A-A and B-B of FIG. 14; and

BEST MODE

Preferred embodiments of the present invention will be described with reference to the accompanying drawings below. In the following description of the present invention, when detailed descriptions of related known functions and configurations may make the gist of the present invention unnecessarily obscure, they will be omitted.

(Configuration of Lubricator)

Figure 1:
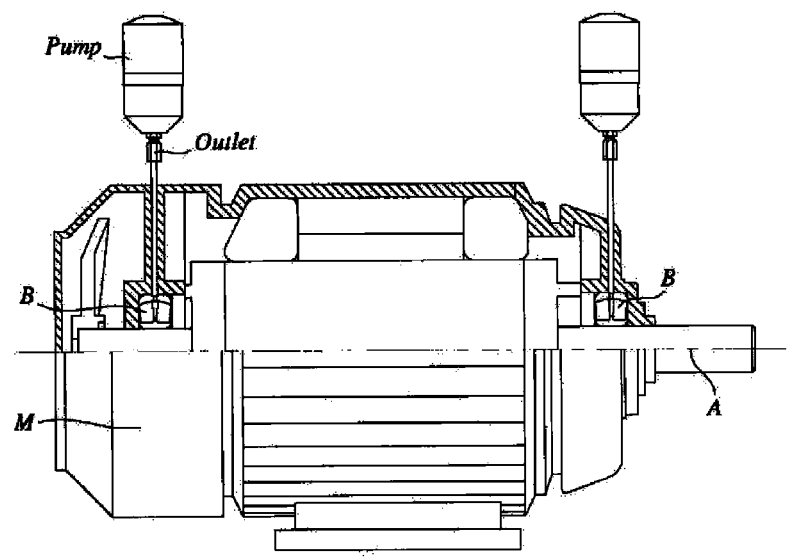
FIG. 1 is a view showing an application of two conventional lubrication pumps.
Figure 2:
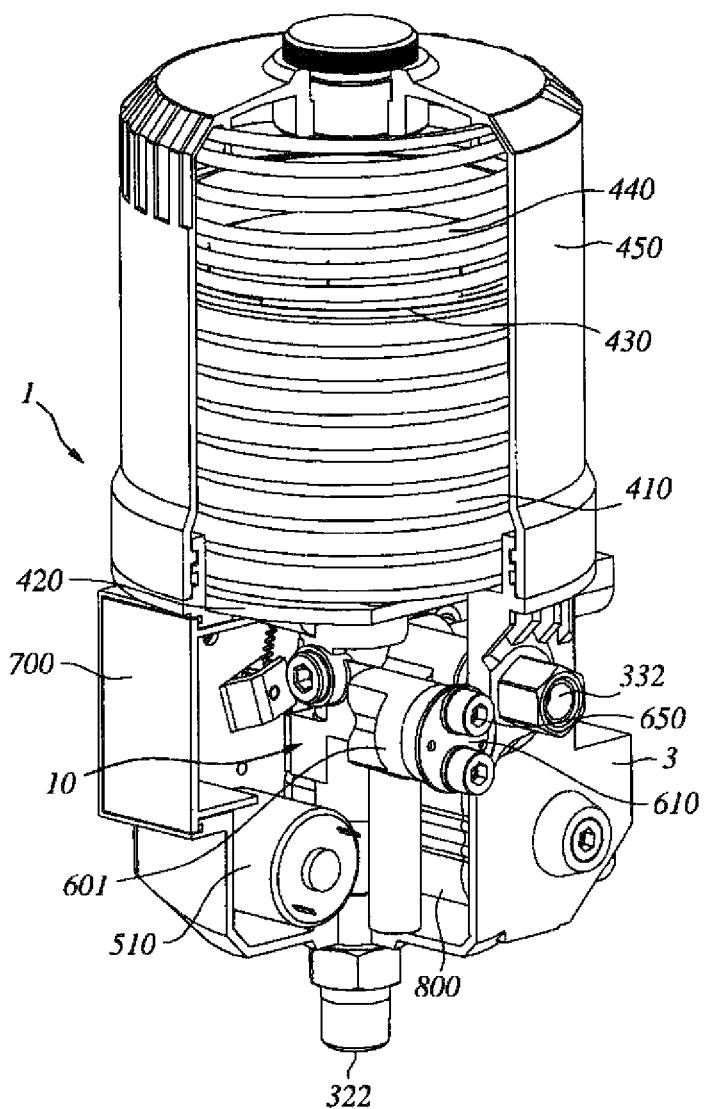
FIG. 2 is a partially cutaway perspective view of a lubricator according to an embodiment of the present invention.
Figure 3:
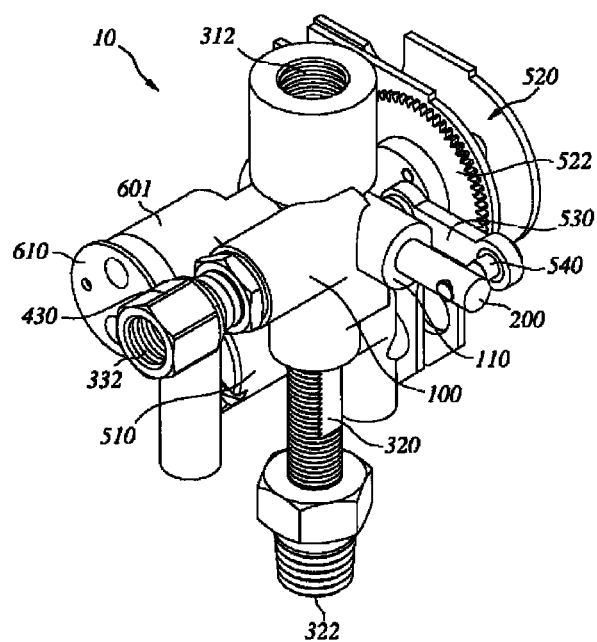
FIG. 3 is a perspective view showing the pumping unit of the lubricator according to the embodiment of the present invention.
Figure 4:
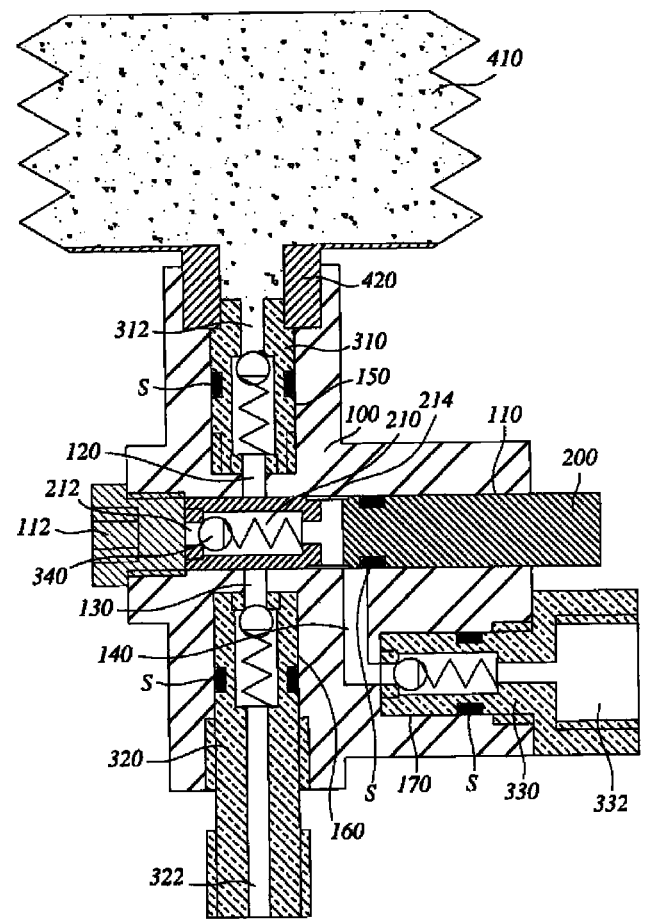
FIG. 4 is a schematic sectional view of the lubricator according to the present invention.

FIG. 2 is a partially cutaway perspective view of a lubricator according to an embodiment of the present invention, FIG. 3 is a perspective view showing a pumping unit of the lubricator according to the embodiment of the present invention, and FIG. 4 is a schematic sectional view of the lubricator according to the present invention.

As shown in FIG. 2, in the lubricator 1 according to the embodiment of the present invention, a pumping unit 10 shown in FIG. 3 is installed within a casing 3. In this case, the pumping unit 10 includes a first outlet 322 and a second outlet 332 through which lubricant is discharged. Furthermore, a lubricant containing unit 410, 420, 430, 440 and 450 from which lubricant is supplied to the pump unit 10 is installed on the top of the casing 3.

A control panel 700 configured to control the pumping operation of the pumping unit 10 and display the operating status of the pumping unit 10 is provided on a side of the outside of the casing 3. A power source unit 800 configured to supply power to a motor 510 of the pumping unit 10 is provided within the casing 3. The power source unit 800 may be a battery, such as dry cells, and may be a DC/AC converter that is supplied with electric power by an external source and converts the electric power into electric power suitable for the driving of the motor 510.

As shown in FIGS. 2 to 4, the lubricator according to the embodiment of the present invention includes a pump body 100, a piston 200, first to fourth check valves 310, 320, 330 and 340, the lubricant containing unit 410, 420, 430, 440 and 450, a piston driving unit 510, 520, 530 and 540, and a cross-porting device 601 and 610. The cross-porting device 601 and 610 is a device configured to allow lubricant to be discharged separately or in a cross-porting manner. The cross-porting device 601 and 610 will be described in detail under a separate title later.

The pump body 100 is made of a metal material. As shown in FIGS. 3 and 4, a cylinder 110, an inlet passage 120, and first and second outlet passages 130 and 140 are formed in the pump body 100.

The cylinder 110 is a cylindrical chamber within which the piston 200 reciprocates. According to the present embodiment, as shown in FIG. 4, the cylinder 110 is formed to pass through the pump body 100. One end of the cylinder 110 is configured to be closed by a plug 112.

The inlet passage 120 is formed in one end portion of the cylinder 110 to communicate with the cylinder 110 while being perpendicular to the longitudinal direction of the cylinder 110. Furthermore, the first outlet passage 130 is formed to communicate with the cylinder 110 in the structure of facing the inlet passage 120 on the opposite side of the cylinder 110.

The second outlet passage 140 is formed to be spaced apart from the locations, at which the inlet passage 120 and the first outlet passage 130 are formed, by predetermined distances in the direction of the other end of the cylinder 110 and to communicate with the cylinder 110.

Furthermore, first to third seating recesses 150, 160 and 170 in which first to third check valves 310, 320 and 330 are disposed are formed on an inlet side of the inlet passage 120 and outlet sides of the first and second outlet passages 120 and 130 of the pump body 100.

The piston 200 is accommodated within the cylinder 110, and pumps lubricant while moving reciprocally. As shown in FIG. 4, an inlet port 212 through which lubricant enters is formed in one end of the piston 200 which comes into contact with the plug 112. Furthermore, a circumferential groove 214 having a predetermined width is formed in the outer circumference of a location spaced apart from one end of the piston by a predetermined distance in the direction of the other end. An inner passage 210 is formed to make the inlet port 212 and the circumferential groove 214 communicate with each other.

The fourth check valve 340 including a ball and a compression spring is provided in the inner passage 210. The check valve 340 provides a structure in which the inlet port 212 is closed by the elastic force of the compression spring in an ordinary stationary state and, when a predetermined or larger amount of pressure is applied to the ball, the inlet port 212 is opened and thus lubricant enters into the inner passage 210. That is, the fourth check valve 340 allows lubricant to enter the inner passage 210 of the piston 200 in a single direction, and prevents lubricant from flowing backward. Meanwhile, a seal is disposed in a recess formed around the outer circumference of the piston 200, and prevents lubricant from leaking through a gap between the piston 200 and the cylinder 110.

The first to third check valves 310, 320 and 330 are installed in the first to third seating recesses 150, 160 and 170 of the pump body 100, respectively. In this case, each of the first to third check valves 310, 320, and 330 is provided with a seal on the outer circumference thereof for the same reason as the fourth check valve 340.

An inlet 312 through which lubricant enters from a lubricant cartridge 410 is formed in one side of the first check valve 310. The inner passage of first check valve 310 communicates with the inlet passage 120 formed in the pump body 100. Furthermore, a ball and a compression spring are disposed within the inner passage of the first check valve 310. A structure in which the ball is operated to selectively close and open the inlet 312 by the elastic force of the compression spring is provided.

A first outlet 322 through which lubricant is discharged is formed in one side of the second check valve 320, and the inner passage of the second check valve 320 communicates with the first outlet passage 130 formed in the pump body 100. Furthermore, a ball and a compression spring are disposed within the inner passage of the second check valve 320. A structure in which the ball is operated to selectively close and open the first outlet passage 130 by the elastic force of the compression spring is provided.

The second outlet 332 through which lubricant is discharged is formed in one side of the third check valve 330, and the inner passage of the third check valve 330 communicates with the second outlet passage 140 formed in the pump body 100. Furthermore, a ball and a compression spring are provided within the inner passage of the third check valve 330. A structure in which the ball is operated to selectively close and open the second outlet passage 140 by the elastic force of the compression spring is provided.

The lubricant containing unit is a container in which lubricant, such as grease or oil, is contained, and is connected to the inlet 312 of the first check valve 310. According to the present embodiment, the lubricant containing unit includes the cartridge 410, a support plate 420, a pressing plate 430, a spring 440, and a cover 450, as shown in FIG. 2.

The cartridge 410 is fully filled with lubricant. When lubricant is exhausted, the cartridge 410 is replaced with a new cartridge 410 fully filled with lubricant. That is, the cartridge 410 is configured such that lubricant is isolated from the ambient air, thereby preventing the lubricant from being contaminated by the entrance of impurities. As shown in FIG. 4, the cartridge 410 is provided with a neck, connected to the inlet 312 of the first check valve 310, in the center portion thereof, and has the shape of a bellows that can be vertically compressed.

As shown in FIG. 4, the support plate 420 is firmly fitted into the upper portion of the first seating recess 150 of the pump body 100, and supports the bottom surface of the cartridge 410.

As shown in FIG. 2, the pressing plate 430 is disposed on the top surface of the cartridge 410. The spring 440 is provided on the top of the pressing plate 430, and the cover 450 is configured to cover the cartridge 410, support plate 420, pressing plate 430 and the spring 440 so that the spring 440 is in the state of being pressed. In this case, the cover 450 and the casing 3 are configured to be coupled to each other in such a manner that a recess and a protrusion formed on the inner surface of the cover 450 and the outer surface of the casing 3, respectively, engage with each other.

Accordingly, the pressing plate 430 is made to compress the bellows-shaped cartridge 410 by the elastic force of the spring 440, thereby allowing lubricant to be smoothly sucked by the pumping unit 10.

The piston driving unit functions to linearly reciprocate the piston 200 within the cylinder 110. In this case, as shown in FIG. 4, the piston 200 reciprocates between a location, at which the end surface of the piston 200 in which the inlet port 212 is formed comes into contact with the plug 112 fastened to one end of the cylinder 110, and a location between the first and second outlet passages 130 and 140.

As shown in FIG. 3, the piston driving unit according to the present embodiment includes the motor 510, a reduction gear train 520, a crank 530, and a pin 540. In this case, the motor 510 and the reduction gear train 520 are coupled to the pump body 100 via fastening means, such as bolts, thereby forming the pumping unit 10.

The motor 510 functions to provide rotating force using electric power supplied by the power source unit 800.

The reduction gear train 520 has a plurality of gears fastened to a fixing plate, and functions to reduce the rotating speed of the motor 510. Accordingly, a large amount of output force is generated at the end gear 522 of the reduction gear train 520.

The crank 530 is pivotably connected to the reduction gear train 520 with one end thereof eccentrically connected to the end gear 522 of the reduction gear train 520. Furthermore, the other end of the crank 530 is pivotably connected to the pin 540 fastened to the other end of the piston 200.

Accordingly, the piston driving unit according to the present embodiment has a structure that converts the rotational movement of the motor 510 into the linear reciprocal movement of the piston 200.

Meanwhile, it will be apparent that in the lubricator 1 according to the present invention, the piston driving unit may be implemented as a linear motion device, such as a pneumatic actuator, a hydraulic actuator, a linear motor or a manual device, in order to directly drive the piston 200 linearly.

(Pumping Operation of Lubricator)

The pumping operation of the lubricator according to the embodiment of the present invention will be described with reference to FIGS. 4 and 5a to 5c below.

FIG. 4 shows the suction standby state of the lubricator according to the embodiment of the present invention. In the suction standby state, the piston 200 is completely inserted into the cylinder 110, and thus the end surface of the piston 200 in which the inlet port 212 is formed comes into contact with the plug 112. This state is the state in which there is no empty space within the cylinder 110. Furthermore, the circumferential groove 214 of the piston 200 is positioned in front of the second outlet passage 140.

Figure 5A:
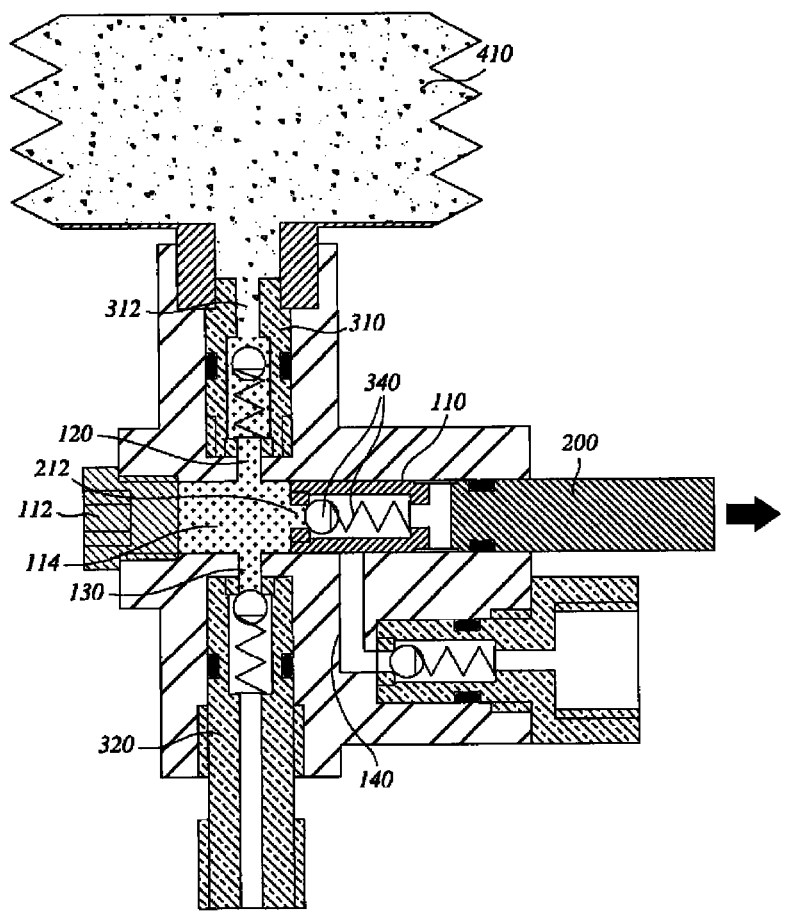
FIGS. 5a to 5c are views illustrating the pumping operation of the lubricator according to the embodiment of the present invention.

FIG. 5a shows the lubricant suction state of the lubricator according to the embodiment of the present invention. Referring to FIG. 5a, the piston 200 moves backward in the direction of an arrow, and thus a suction chamber 114 is formed in front of the piston 200. FIG. 5a shows the state in which the piston 200 has maximally moved backward, in which case the distance between the plug 112 and the piston 200 corresponds to the stroke of the piston. Meanwhile, the front end surface of the piston 200 is positioned between the first and second outlet passages 130 and 140, and the circumferential groove 214 of the piston 200 is positioned behind the second outlet passage 140.

In this case, the first check valve 310 is opened due to a difference in pressure because the suction chamber 114 is in a substantially vacuum state. Accordingly, lubricant contained in the cartridge 410 fills the suction chamber 114 through the inlet 312 of the first check valve 310 and inlet passage 120 of the pump body 100.

Meanwhile, FIG. 5a is shown on the assumption that the suction chamber 114 and the inner passages are filled with lubricant through the single movement of the piston 200 notwithstanding that the total volume of lubricant that enters into the suction chamber 114 and the inner passages is larger than the volume of the suction chamber 114 formed by the backward movement of the piston 200. However, in practice, this state is established by several cycles of suction and discharging through the reciprocating movement of the piston 200. In the following description, the same situation is applied.

Figure 5B:
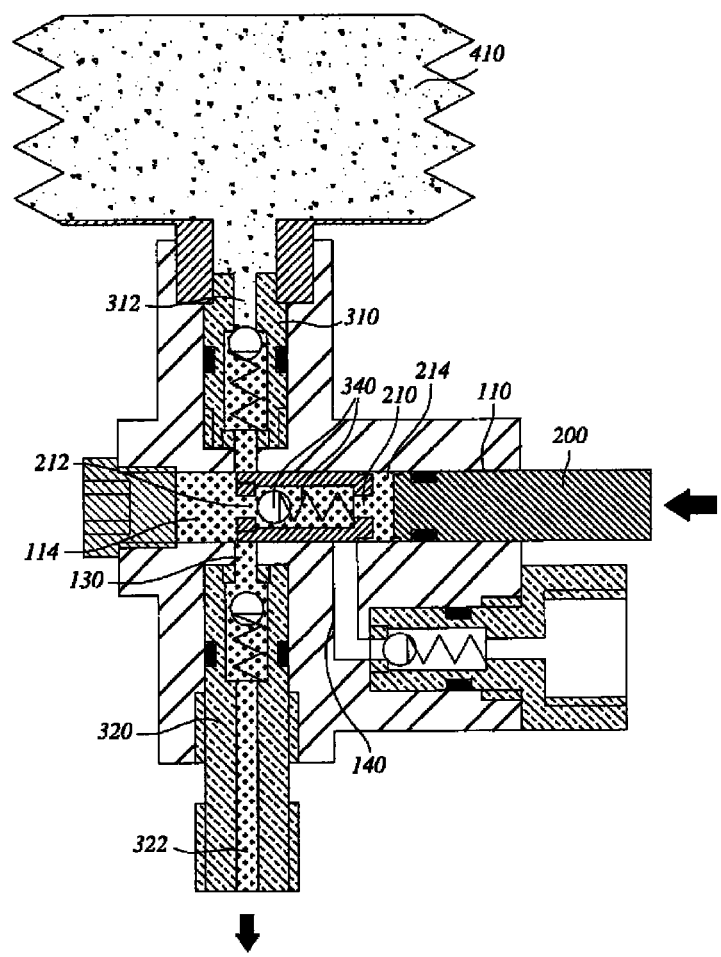

FIG. 5b shows the state in which lubricant is discharged through the first outlet 322. FIG. 5b shows the state in which the piston 200 is moved forward by about a half of the stroke and thus the volume of the suction chamber 114 is reduced. The pressure within the suction chamber 114 is increased during the forward movement of the piston 200, and thus the second check valve 320 and the fourth check valve 340 are opened.

In this case, when the second check valve 320 is opened, lubricant is discharged through the first outlet 322 after flowing through the first outlet passage 130. Furthermore, lubricant discharged through the first outlet 322 is supplied to the lubrication target point of a rotating machine through a pipe (not shown).

Furthermore, as the fourth check valve 340 is opened, lubricant enters into the inner passage 210 of the piston 200.

Figure 5C:
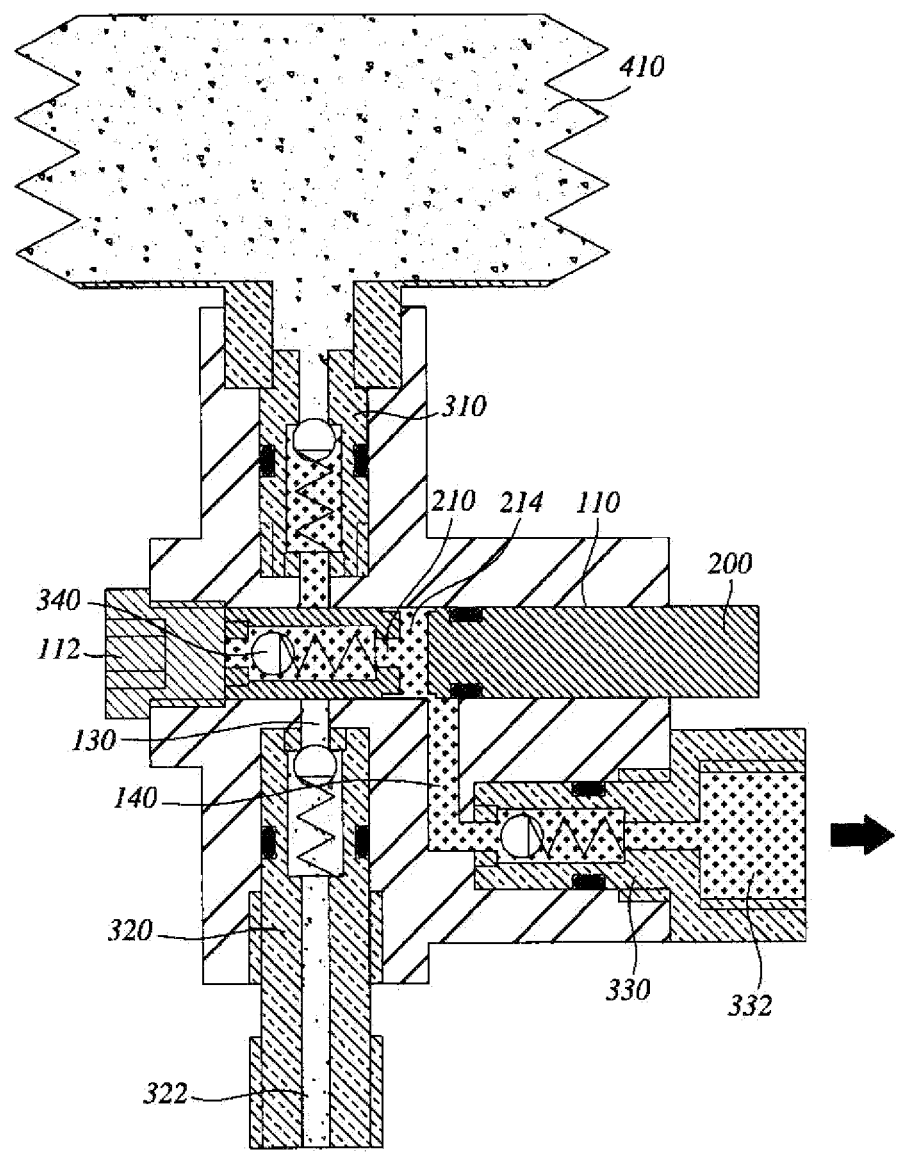

FIG. 5c shows the state in which lubricant is discharged through the second outlet 332. Referring to FIG. 5c, the Piston 200 has maximally moved forward and comes into contact with the plug 112, and thus the volume of the suction chamber 114 has been eliminated. In this process, the fourth check valve 340 is kept open due to the high pressure of the suction chamber 114. In this case, the circumferential groove 214 of the piston 200 communicates with the second outlet passage 140, and thus the third check valve 330 is opened, with the result that lubricant is discharged through the second outlet 332.

Furthermore, since the first outlet passage 130 is closed by the outer circumference of the piston 200, the second check valve 320 is closed, and thus the discharging through the first outlet passage 130 is stopped.

(Configuration and Operation of Cross-Porting Device)

The cross-porting device 601 and 610 of the lubricator according to the embodiment of the present invention 1 will be described with reference to the accompanying drawings below.

First, cross-porting is described. The "cross-porting" generally refers to a method of combining two outlet passages formed independently in a pump or valve device and discharging fluid, flowing through the two outlet passages, through a single outlet. The two outlet passages basically perform the function of supplying fluids to two points through respective outlets. However, there may be a case where fluid needs to be supplied to a single point. A common method for dealing with this case is a method of connecting two outlets using a tee-type fitting and thus allowing fluid to exit through only a single outlet. However, this method using the tee-type fitting requires complicated working processes using a plurality of pipe joints and tools, and occupies a large space. Accordingly, this method is not suitable for application to a small pump or a valve device.

The cross-porting device according to the present invention, which is described below, uses a converter plate. This cross-porting device is very simple in construction and convenient in assembly and disassembly. This device enables fluid to be discharged separately through two outlets and to be discharged through a single outlet by performing a cross-porting function when required.

Figure 6:
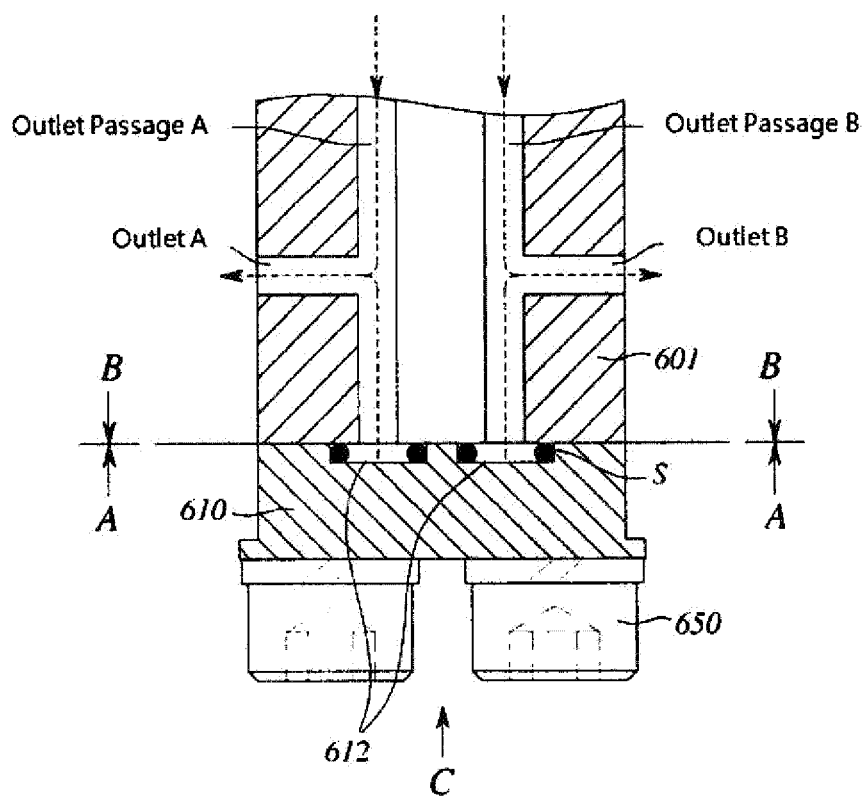
FIG. 6 is a cross-sectional view illustrating the separate discharging by the cross-porting device according to the embodiment of the present invention.
Figure 7:
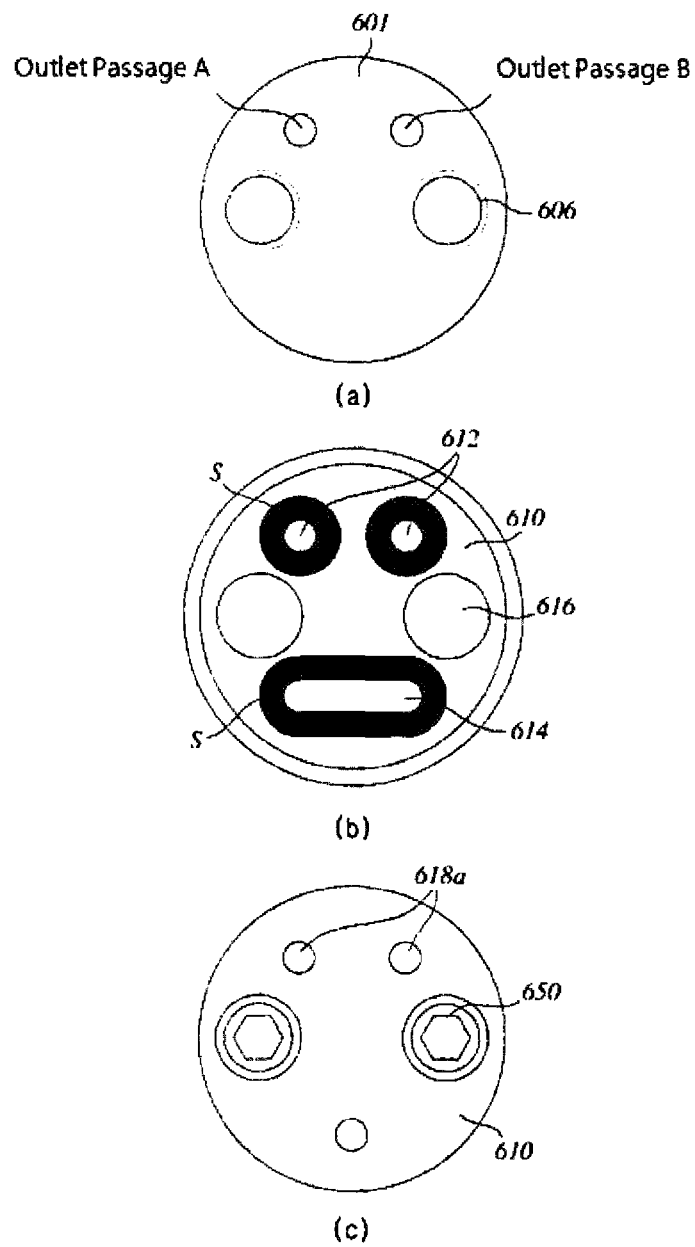
FIG. 7 shows diagrams viewed from directions A-A, B-B and C of FIG. 6.

FIG. 6 is a cross-sectional view illustrating the separate discharging by a cross-porting device according to an embodiment of the present invention, and FIG. 7 shows diagrams viewed from directions A-A, B-B and C of FIG. 6. According to the embodiment of the present invention, the cross-porting device includes a converter plate 610 and fastening bolts 650, and is disposed in a cross-porting device body 601 positioned on one side of the pump body 100, as shown in FIGS. 2 and 3.

As shown in FIG. 6, an outlet passage A and an outlet passage B branched off from the inner passages of the above-described second and third check vales 320 and 330 are formed in the cross-porting device body 601. Furthermore, as shown in FIG. 7a, the outlet ports of the outlet passage A and the outlet passage B are formed in the upper portions of one side surface of the cross-porting device body 601. Furthermore, a pair of female screws 606 with which the fastening bolts 650 engage is formed in one side of the cross-porting device body 601.

As shown in FIG. 7b, a pair of right circular recesses 612 and a single oblong circular recess 614 are formed in the upper and lower portions of one surface of the converter plate 610. In this case, seals S configured to prevent the leakage of lubricant are provided on the inner circumferences of the right circular recesses 612 and the oblong circular recess 614. Furthermore, a pair of through holes 616 through which the fastening bolts 650 passes is formed in the center portion of the converter plate 610.

In the cross-porting device according to the embodiment of the present invention, as shown in FIGS. 6 and 7, the converter plate 610 is disposed on the cross-porting device body 601 such that the pair of right circular recesses 612 covers the outlet ports of the outlet passage A and the outlet passage B, and then the converter plate 610 is fastened by the fastening bolts 650, in order to implement separate discharging.

Accordingly, as shown in FIG. 6, lubricant enters through the outlet passage A and the outlet passage B. In this case, the outlet ports of the outlet passage A and the outlet passage B are isolated from each other by the right circular recesses 612 of the converter plate 610, and thus lubricant entering through the outlet passage A and lubricant entering through the outlet passage B are discharged separately through the outlet port A and the outlet port B.

Meanwhile, in the cross-porting device according to the present invention, a pair of separate discharging marks 618a is positioned on the top of the converter plate 610, as shown in FIG. 7c. A user can recognize the separate discharging by reading these marks.

Figure 8:
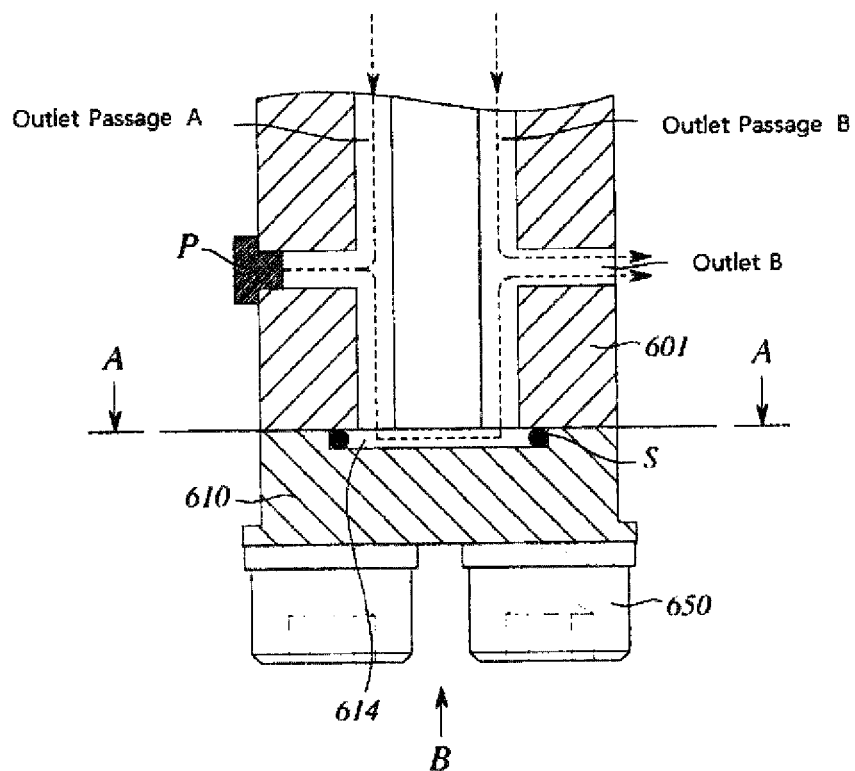
FIG. 8 is a sectional view illustrating the cross-porting by the cross-porting device according to the embodiment of the present invention.

FIG. 8 is a sectional view illustrating the cross-porting by the cross-porting device according to the embodiment of the present invention, and FIG. 9 shows diagrams viewed from directions A-A and B-B of FIG. 8.

The lubricator according to the embodiment of the present invention may selectively discharge lubricant through one outlet by combining the two outlet passages.

As shown in FIGS. 8 and 9, the converter plate 610 is disposed on the cross-porting device body 601 such that the oblong circular recess 614 covers all the outlet ports of the outlet passage A and the outlet passage B by rotating the converter plate 610 shown in FIG. 7 by an angle of 180°, i.e. exchanging the location of the pair of right circular recesses 612 and the location of the oblong circular recess 614, and then the converter plate 610 is fastened by the fastening bolts 650. Thereafter, the outlet port A is closed by a plug P.

Accordingly, since the outlet port A is closed, lubricant introduced through the outlet passage A flows through the oblong circular recess 614 and is discharged through the outlet port B along with lubricant introduced through the outlet passage B in a cross-porting manner. When the cross-porting is performed, the amount of lubricant is twice the amount of lubricant that is separately discharged.

Meanwhile, in the cross-porting device according to the present invention, as shown in FIG. 9b, a single cross-porting mark 618b is positioned on the top of the converter plate 610. A user can recognize the cross-porting by reading this mark.

Figure 10A:
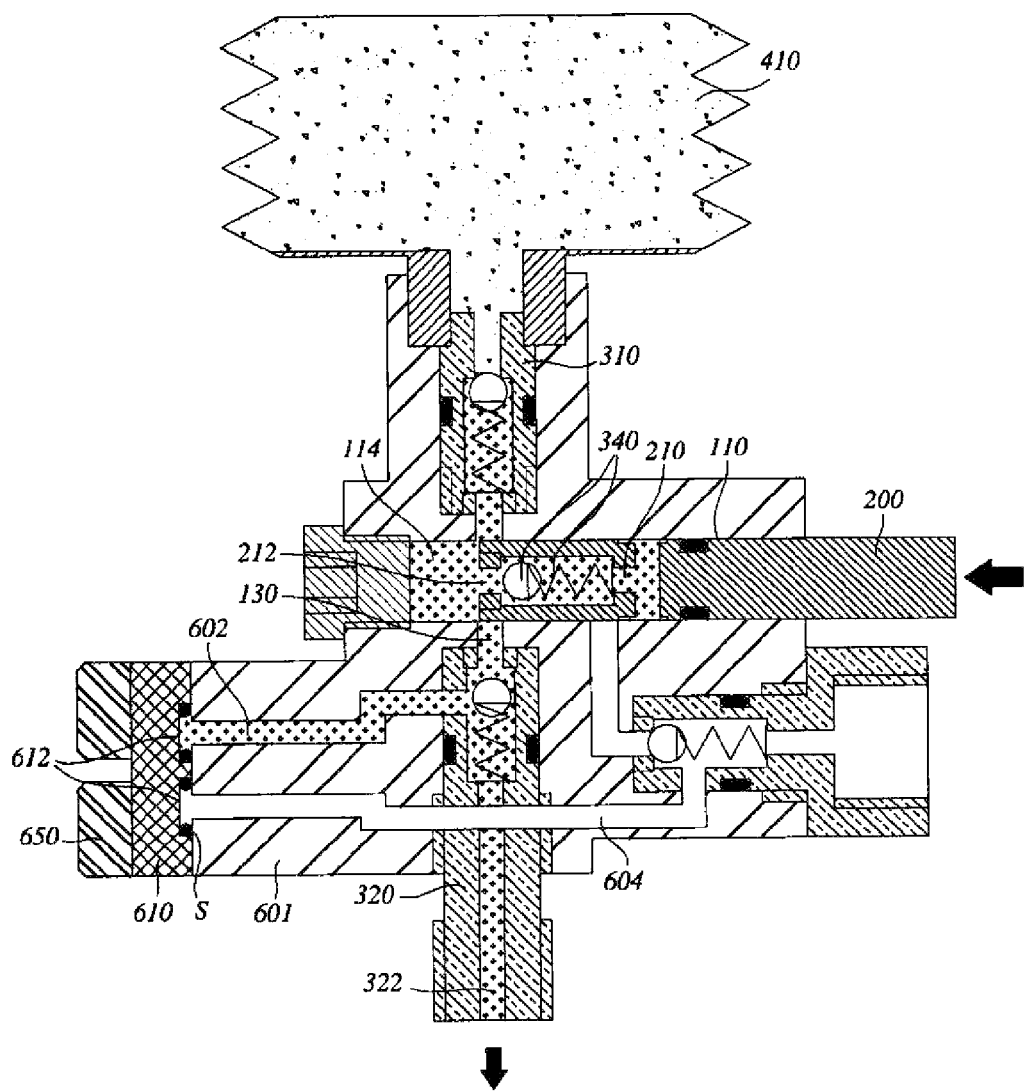
FIGS. 10a and 10b are sectional views illustrating the separate discharging operation of the lubricator according to the embodiment of the present invention.
Figure 10B:
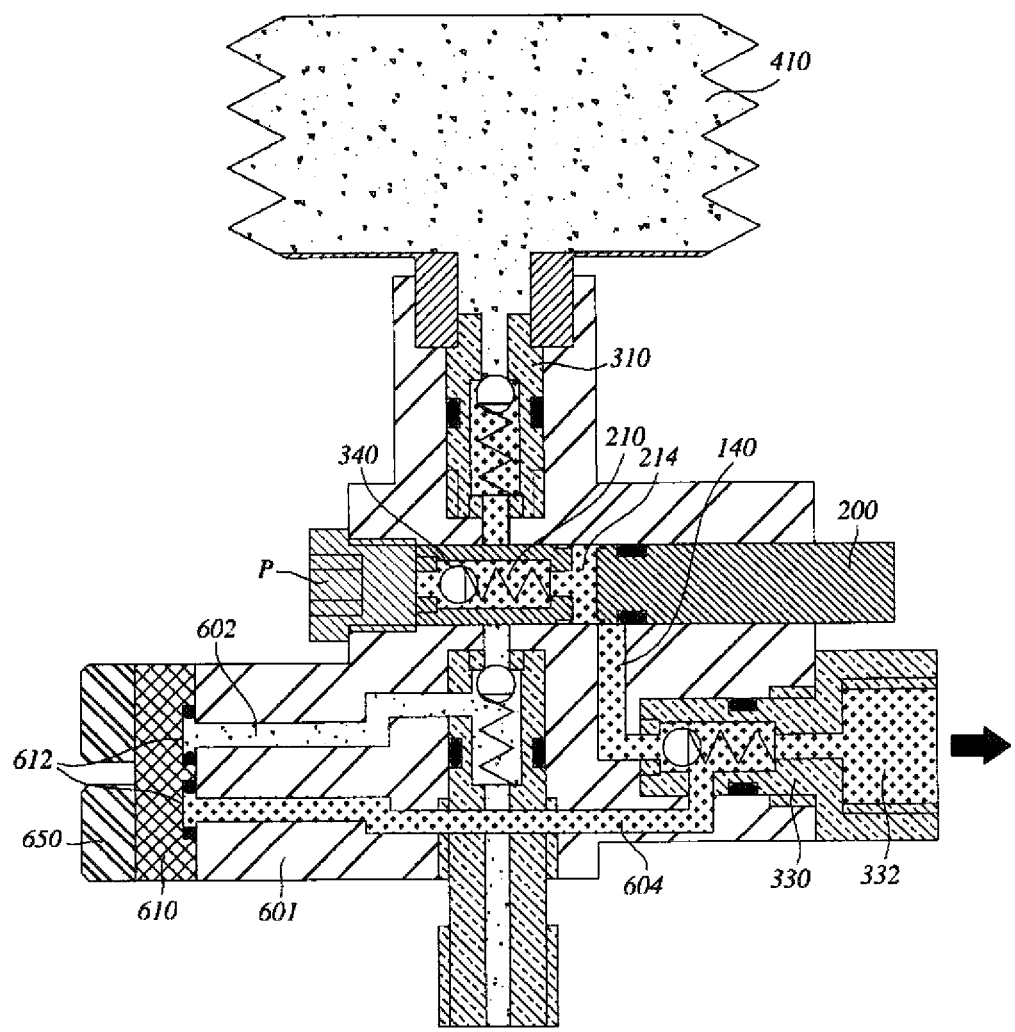

FIGS. 10a and 10b are sectional views illustrating the separate discharging operation of the lubricator according to the embodiment of the present invention. In the lubricator according to the embodiment of the present invention, as shown in FIGS. 10a and 10b, the cross-porting device may further include first and second branch passages 602 and 604, the cross-porting device body 601, the converter plate 610, and the fastening bolts 650.

One end of the first branch passage 602 is branched off from the inner passage of the second check valve 320, and one end of the second branch passage 604 is branched off from the inner passage of the third check valve 330. The other ends of the first branch passage 602 and the second branch passage 604 extend to the cross-porting device body 601 positioned on one side of the pump body 100, and thus a pair of outlet ports is formed in one side surface of the cross-porting device body 601. In this case, in the converter plate 610, the pair of right circular recesses 612 covers the outlet ports of the first and second branch passages 602 and 603.

FIG. 10a shows the state in which lubricant is discharged through the first outlet 322. Referring to FIG. 10a, when the piston 200 moves forward in the direction of an arrow, the second check valve 320 is opened, and thus lubricant is discharged through the first outlet 322. In this case, the end of the first branch passage 602 is closed by one of the pair of right circular recesses 612 of the converter plate 610.

FIG. 10b shows the state in which lubricant is discharged through the second outlet 324. Referring to FIG. 10b, the piston 200 has maximally moved forward, and thus the second check valve 320 is closed and the fourth check valve 340 is opened. Accordingly, lubricant flows through the inner passage 211 and the circumferential groove 214 of the piston 200 and the second outlet passage 140, and is discharged through the second outlet 332 of the third check valve 330. In this case, the end of the second branch passage 604 is closed by one of the pair of right circular recesses 612 of the converter plate 610.

Figure 11A:
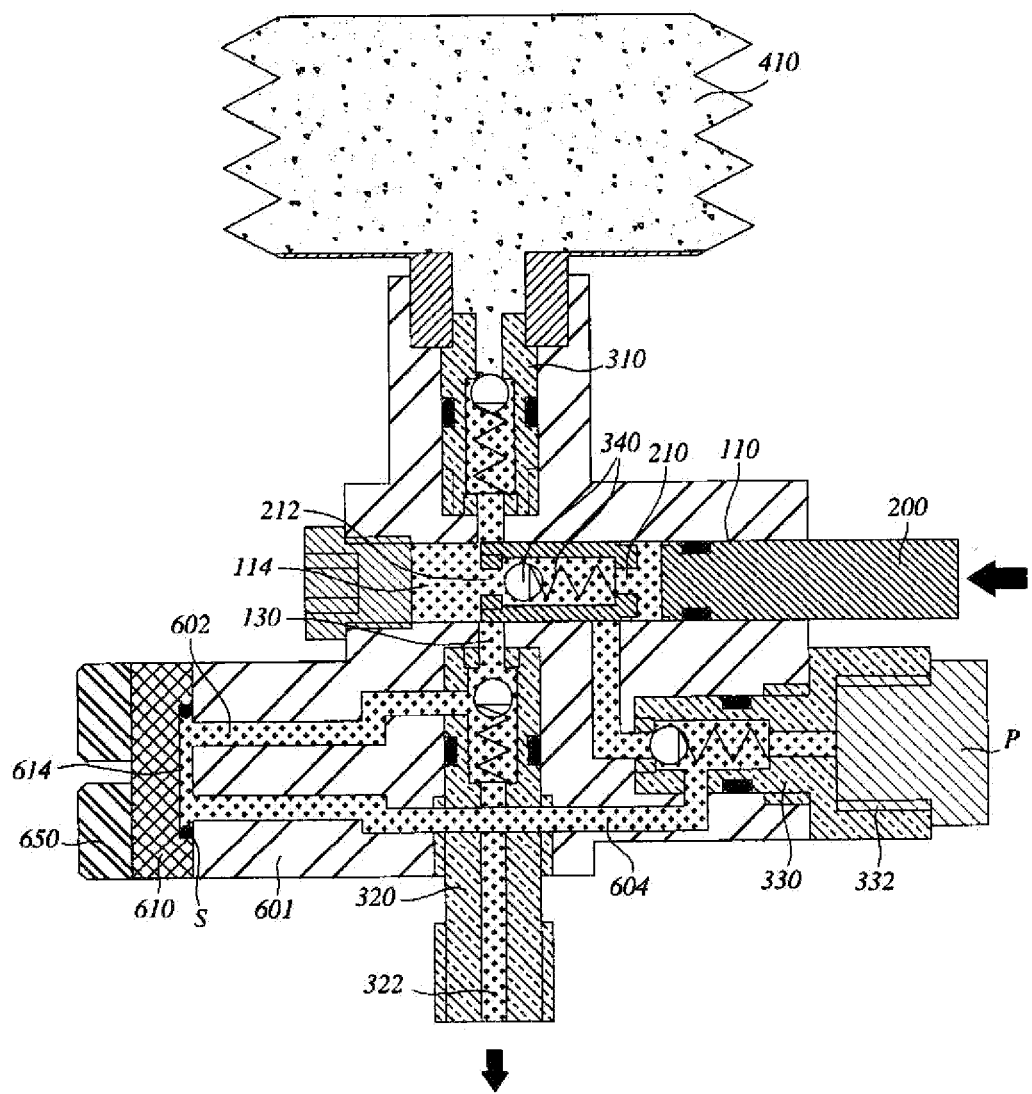
FIGS. 11a and 11b are sectional views illustrating the cross-porting operation of the lubricator according to the embodiment of the present invention.
Figure 11B:
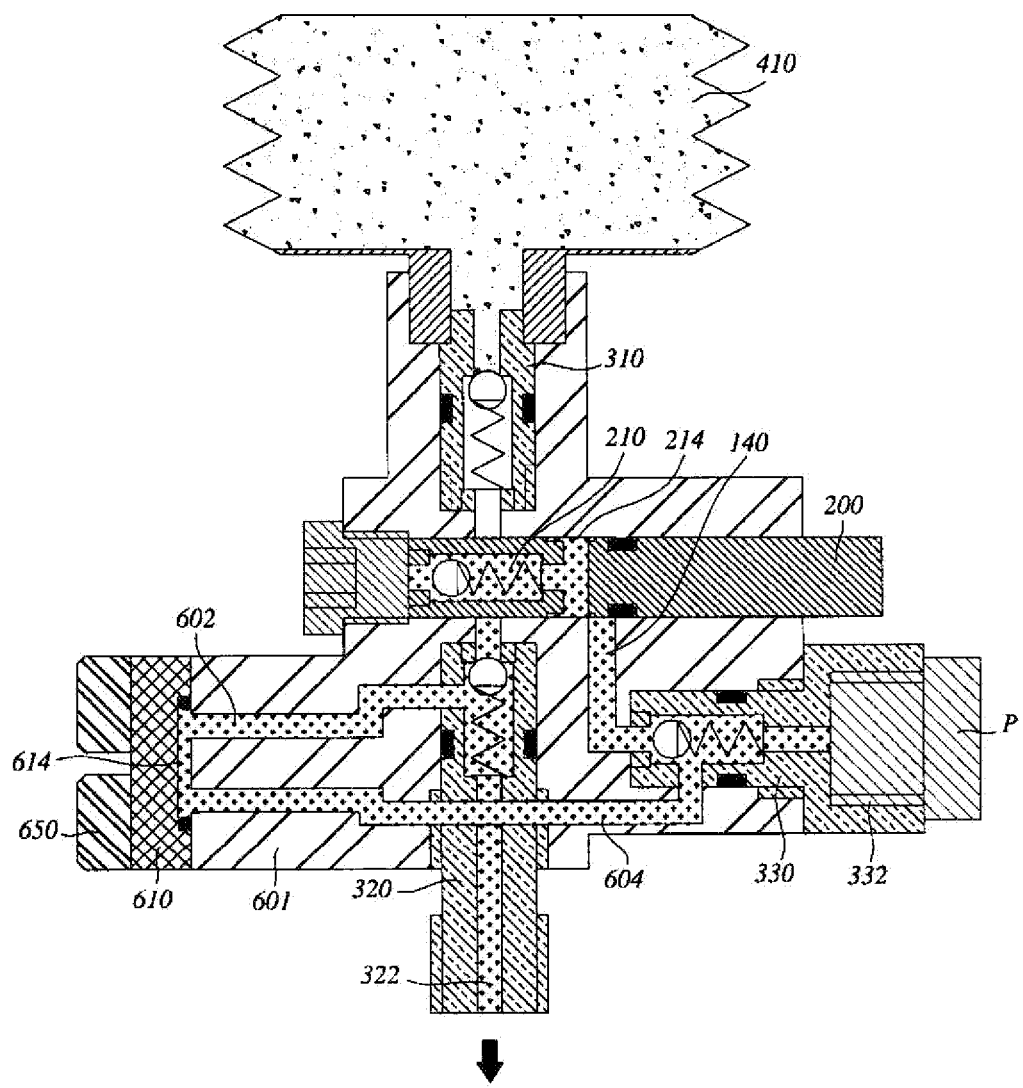

FIGS. 11a and 11b are sectional views illustrating the cross-porting operation of the lubricator according to the embodiment of the present invention. As shown in FIGS. 11a and 11b, the cross-porting operation of the lubricator according to the embodiment of the present invention is achieved by placing the converter plate 610 on the cross-porting device body 601 by rotating the converter plate 610 by an angle of 180°. In this case, the oblong circular recess 614 of the converter plate 610 covers all the outlets of the first and second branch passages 602 and 604. When the first outlet 322 of the second check valve 320 or the second outlet 332 of the third check valve 330 is closed by a plug P, cross-porting is performed through the other outlet that is not closed by the plug P.

FIGS. 11a and 11b show a case in which the second outlet 332 is closed by the plug P. The cross-porting is performed through the first outlet 322 because the first and second branch passages 602 and 604 communicate with each other through the oblong circular recess 614 of the converter plate 610. In this case, the amount of lubricant discharged through the first outlet 322 is twice the amount of lubricant that is separately discharged.

(Configuration of Cross-Porting Device According Modified Embodiment)

Figure 12:
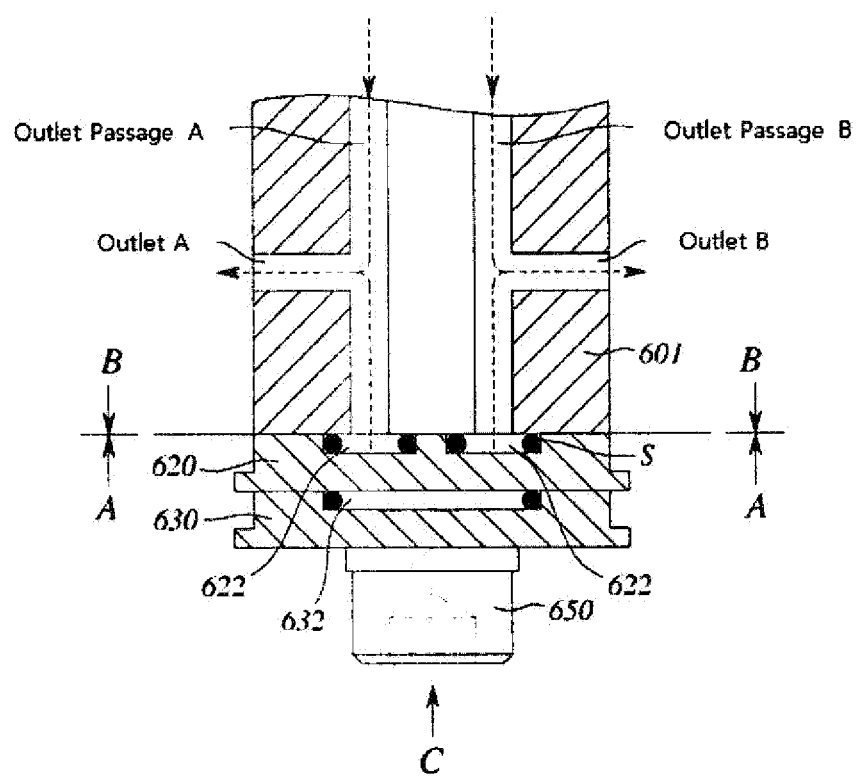
FIG. 12 is a sectional view illustrating the separate discharging by a modified embodiment of the cross-porting device.
Figure 13:
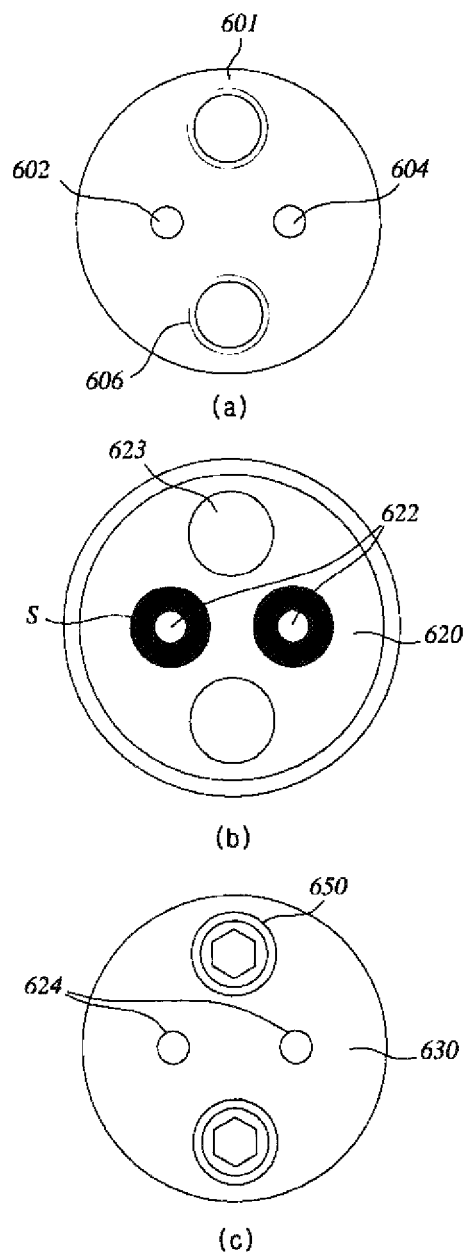
FIG. 13 shows diagrams viewed from directions A-A, B-B and C of FIG. 12.

FIG. 12 is a sectional view illustrating the separate discharging of a modified embodiment of the cross-porting device, and FIG. 13 shows diagrams viewed from directions A-A, B-B and C of FIG. 12. The cross-porting device according to the present embodiment is different from the above-described device using a single converter palate in that twin converter plates including a first converter plate 620 and a second converter plate 630 are employed, as shown in FIGS. 12 and 13. Descriptions of the other components will be omitted because they are identical to those of the single-palate converter.

As shown in FIGS. 12 and 13, a pair of right circular recesses 622 is formed in the center portion of one side of the first converter plate 620.

A single oblong circular recess 614 is formed in the center portion of one surface of the second converter plate 630.

As shown in FIG. 12, to enable lubricant to be discharged separately through an outlet port A and an outlet port B, the first converter plate 620 and the second converter plate 630 are sequentially arranged on one surface of the cross-porting device body 601, and the twin converter plates 620 and 630 are fastened with the fastening bolts 650. In this case, the pair of right circular recesses 622 of the first converter plate 620 covers the outlet port of the outlet passage A and the outlet port of the outlet passage B, respectively. Accordingly, lubricant introduced through the outlet passage A and lubricant introduced through the outlet passage B are discharged separately through the outlet port A and the outlet port B.

Meanwhile, it can been seen that, in the cross-porting device according to the present modified embodiment, a pair of separate discharging marks 624 is provided on the outer surface of the second converter plate 630, as shown in FIG. 13c, and thus a user can recognize the separate discharging by reading these marks.

Figure 14:
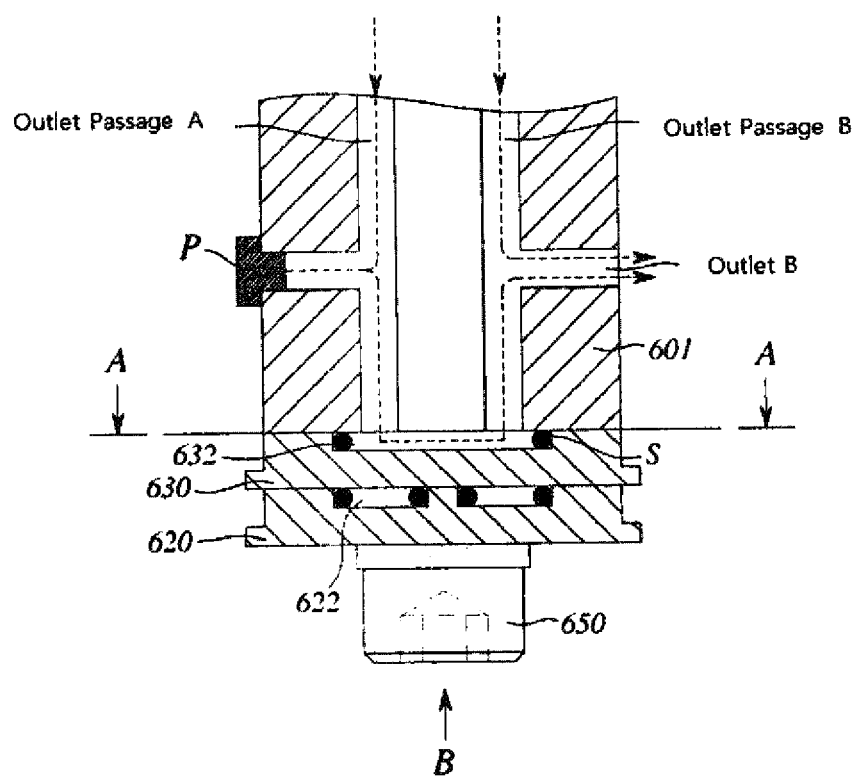
FIG. 14 is a sectional view illustrating the cross-porting by the modified embodiment of the cross-porting device.

FIG. 14 is a sectional view illustrating the cross-porting operation of the modified embodiment of the cross-porting device, and FIG. 15 shows diagrams viewed from directions A-A and B-B of FIG. 14. In order to discharge lubricant selectively through one outlet by combining the outlet passage A and the outlet passage B, as shown in FIG. 14, the sequence of the arrangement of the first converter plate 620 and the second converter plate 630 shown in FIG. 12 is changed. That is, the second converter plate 630 and the first converter plate 620 are sequentially disposed on one surface of the cross-porting device body 601, and the twin converter plates 620 and 630 are fastened using the fastening bolts 650. In this case, the outlet passage A and the outlet passage B are connected to each other as the oblong circular recess 632 of the second converter plate 630 covers all the outlet ports of the outlet passage A and the outlet passage B. Furthermore, when the outlet port A is closed by the plug P, lubricant introduced through the outlet passage A flows through the oblong circular recess 632 of the second converter plate 630, and is discharged through the outlet port B along with lubricant introduced through the outlet passage B in a cross-porting manner.

Meanwhile, it can be seen that, in the cross-porting device according to the modified embodiment, a single cross-porting mark 634 is disposed on the outer surface of the first converter plate 620 as shown in FIG. 15b, and thus a user can recognize the cross-porting by reading this mark.

Figure 16:
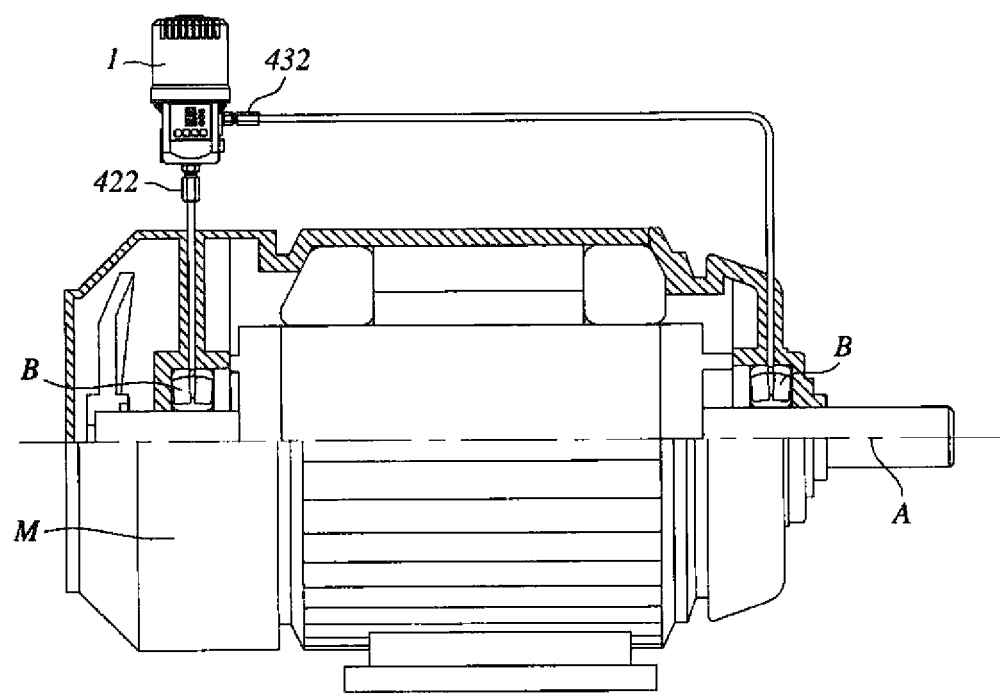
FIG. 16 is a view showing an application of the lubricator according town embodiment of the present invention.

FIG. 16 is a view showing an application of a lubricator according to an embodiment of the present invention. The lubricator 1 according to the embodiment of the present invention includes two outlet ports 422 and 432 as described above. Accordingly, the lubricator 1 according to the present invention can supply lubricant independently to two bearings B, which support the rotary shaft A of the motor M, without using a distributing device.

Although the present invention has been described by the limited embodiments and accompanying drawings, the present invention is not limited thereto. It will be apparent that a person having ordinary knowledge in the art to which the present invention belongs can make various changes and modifications within the technical spirit of the present invention and a range equivalent to the following claims.

The invention claimed is:
1. A lubricator comprising:
a pump body configured to include:
   a cylinder configured such that one end thereof is closed and a remaining end thereof is open;
   an inlet passage formed on one end side of the cylinder perpendicularly to the cylinder, and formed to communicate with the cylinder;

a first outlet passage disposed opposite the inlet passage, and formed to communicate with the cylinder; and
a second outlet passage spaced apart from locations, at which the inlet passage and the first outlet passage are formed, by predetermined distances in a direction of the remaining end of the cylinder, and formed to communicate with the cylinder;
a piston configured to include:
an inlet port formed at one end thereof;
a circumferential groove spaced apart from the inlet port by a predetermined distance in a direction of a remaining end thereof; and
an inner passage configured to connect the inlet port and the circumferential groove, and configured to be inserted into the cylinder;
first to fourth check valves provided on an inlet side of the inlet passage, outlet sides of the first and second outlet passages, and the inner passage of the piston, respectively;
a lubricant containing unit configured to contain lubricant, and connected to the first check valve;
a piston driving unit configured to drive the piston so that the inlet port of the piston reciprocates between the one end of the cylinder and a location between the first and second outlet passages;
a cross-porting device body positioned on one side of the pump body;
a first branch passage having one end branched off from an inner passage of the second check valve and the other end extending to the cross-porting device body and having an outlet formed on one side of the cross-porting device body;
a second branch passage having one end branched off from an inner passage of the fourth check valve and the other end extending to the cross-porting device body and having an outlet formed on one side of the cross-porting device body; and
at least one flow converter plate including:
a pair of right circular recesses to cover the outlets of the first branch passage and the second branch passage, respectively; and
an oblong circular recess to simultaneously cover the outlets of the first branch passage and the second branch passage,
wherein the lubricant is discharged separately through the first and second outlets or is discharged through one of the first and second outlets in a cross-porting manner.

2. The lubricator of claim 1, wherein:
the first check valve comprises an inlet through which the lubricant enters, and is fitted into a first seating recess formed in the pump body to communicate with the inlet passage; and
the second and third check valves comprise first and second outlets, respectively, through which the lubricant is discharged, and are fitted into second and third seating recesses, respectively, formed in the pump body to communicate with the first and second outlet passages.

3. The lubricator of claim 2, wherein each of the first to fourth check valves comprises a valve structure that includes a ball and a compression spring so that a corresponding one of the inlet, the first outlet passage, the second outlet passage and the inlet port is selectively opened and closed.

4. The lubricator of claim 2, wherein each of the piston and the first to third check valves is provided with a seal formed on an outer circumference thereof.

5. The lubricator of claim 1, wherein the lubricant containing unit is a cartridge fully filled with lubricant, and is replaceable with a fully filled cartridge when the lubricant is exhausted.

6. The lubricator of claim 5, wherein:
the lubricant containing unit comprises a neck, connected to the first check valve, in a center portion of a bottom surface thereof; and
the lubricant containing unit further comprises:
a cartridge configured to have a shape of a bellows that is vertically pressed;
a support plate configured to support a bottom surface of the cartridge;
a pressing plate disposed on a top surface of the cartridge;
a spring, configured to push down the pressing plate; and
a cover configured to cover the cartridge, the support plate, the pressing plate and the spring so that the spring is in the state of being pressed.

7. The lubricator of claim 1, wherein:
the piston driving unit comprises a motor configured to provide rotating speed, a reduction gear train configured to reduce the rotating speed of the motor, a crank eccentrically connected to an end gear of the reduction gear train, and a pin configured to connect the crank and a remaining end of the piston; and
the piston driving unit converts a rotational movement of the motor into a linear reciprocal movement of the piston.

8. The lubricator of claim 1, wherein the piston driving unit is a linear motion device comprising one of a pneumatic actuator, a hydraulic actuator, a linear motor, and a manual device.

9. The lubricator of claim 1, wherein a seal is formed on an inner circumference of each of the pair of right circular recesses and the oblong circular recess.

10. The lubricator of claim 1, wherein the converter plate is provided with marks configured to indicate separate discharging and cross-porting.

* * * * *